United States Patent [19]

Bose

[11] 4,438,519
[45] Mar. 20, 1984

[54] METHODS, AND APPARATUS, FOR TRANSMITTING HIGH-BIT-RATE DIGITAL DATA IN POWER LINE COMMUNICATION MEDIA HAVING HIGH HARMONIC NOISE CONTENT

[75] Inventor: Sanjay K. Bose, Schenectady, N.Y.

[73] Assignee: General Electric Company, Schenectady, N.Y.

[21] Appl. No.: 260,432

[22] Filed: May 4, 1981

[51] Int. Cl.$^3$ ............................................. H04L 27/10
[52] U.S. Cl. .......................................... 375/1; 375/23; 332/16 R
[58] Field of Search ................... 375/1, 23, 45, 62, 79, 375/80, 88, 97, 98, 65; 332/16 R; 340/825.58; 179/15.55; 455/29

[56] References Cited

U.S. PATENT DOCUMENTS

| | | | |
|---|---|---|---|
| 3,117,277 | 1/1964 | Magondeaux | 375/65 |
| 3,671,867 | 6/1972 | Schwarz | 375/98 |
| 3,691,464 | 9/1972 | Dayton et al. | 375/1 |
| 3,777,269 | 12/1973 | Brady | 332/16 R |
| 3,824,466 | 7/1974 | Olier et al. | 455/29 |
| 4,065,722 | 12/1977 | Francis | 375/88 |
| 4,112,372 | 9/1978 | Holmes et al. | 375/1 |
| 4,122,393 | 10/1978 | Gordy et al. | 375/1 |
| 4,291,410 | 9/1981 | Caples et al. | 375/98 |
| 4,328,587 | 5/1982 | Mizuno | 375/97 |

*Primary Examiner*—Robert L. Griffin
*Assistant Examiner*—Stephen Chin
*Attorney, Agent, or Firm*—Geoffrey H. Krauss; James C. Davis, Jr.; Marvin Snyder

[57] ABSTRACT

In a power line data communications system, high-bit-rate digital data is transmitted through a communications media, having high harmonic noise content, by use of a frequency-modulated chirp waveform. The chirp waveform instantaneous frequency is at a predetermined center frequency at the start, midpoint and end of each bit time interval, and makes substantially linear frequency changes to a maximum frequency and a minimum frequency at selected ones of the one-quarter and three-quarter bit-time-interval times. A binary-one data bit is transmitted by increasing the instantaneous frequency to reach the maximum frequency at the one-quarter interval time, then decreasing the frequency to reach a minimum frequency at the three-quarter interval time, and reducing the instantaneous frequency thereafter to reach the center frequency at the end of the bit time interval. A binary-zero data bit is transmitted by initially decreasing the instantaneous frequency to reach the minimum frequency at the one-quarter interval time, then increasing the instantaneous frequency to reach the maximum frequency at the three-quarter interval time, and reducing the instantaneous frequency thereafter to reach the center frequency at the end of the bit time interval.

One presently preferred embodiment of apparatus for transmitting the chirp frequency-modulation signal, and one presently preferred embodiment of apparatus for receiving the chirp frequency-modulated waveform for recovering the data modulated thereon, and associate timing information, are disclosed.

39 Claims, 21 Drawing Figures

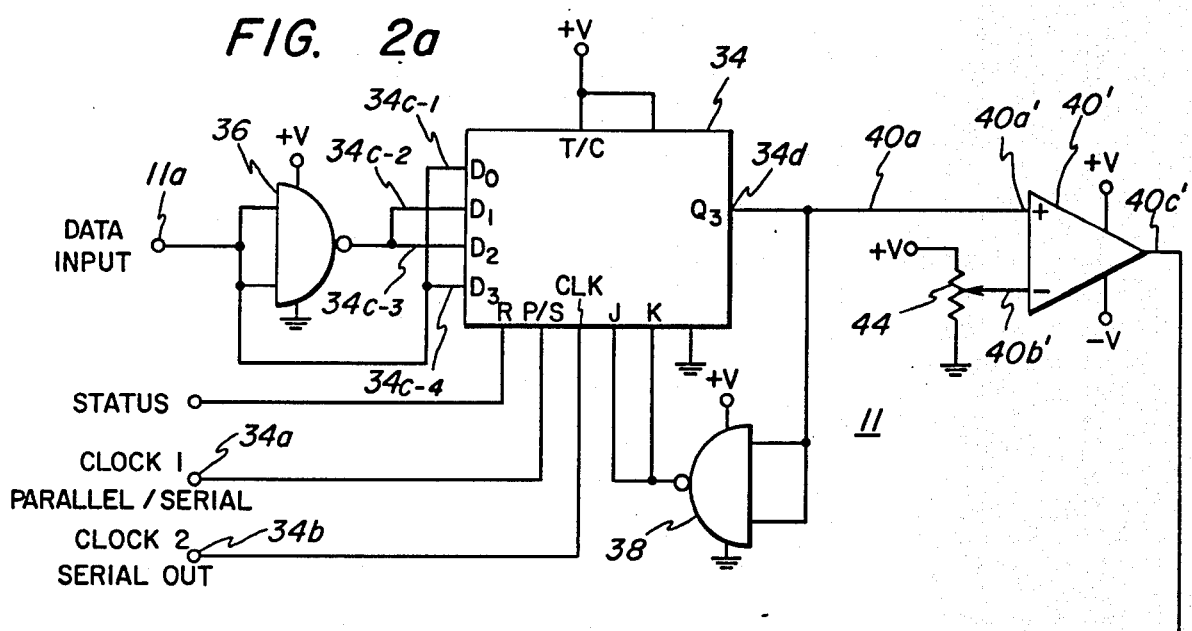
FIG. 2a
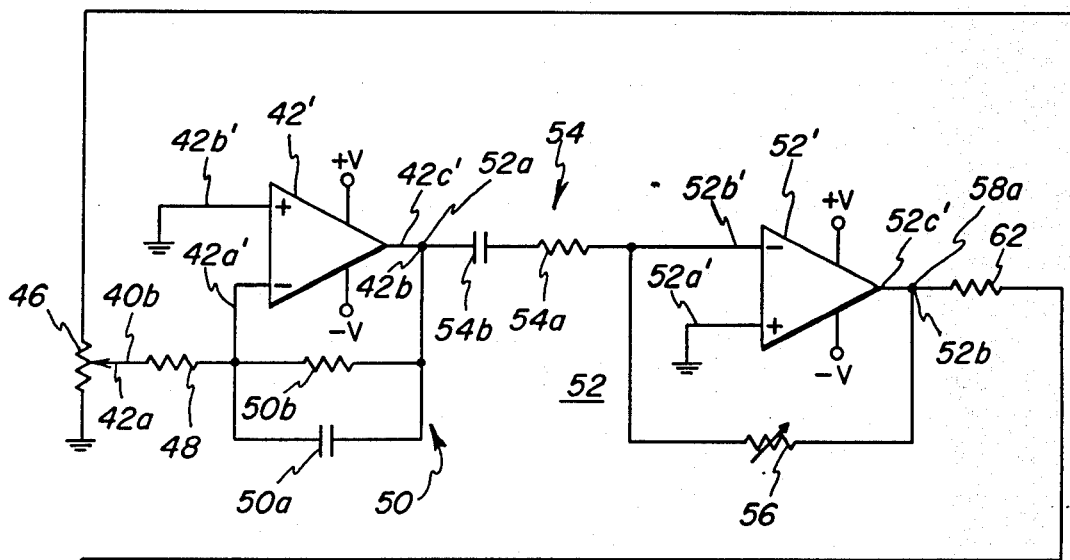
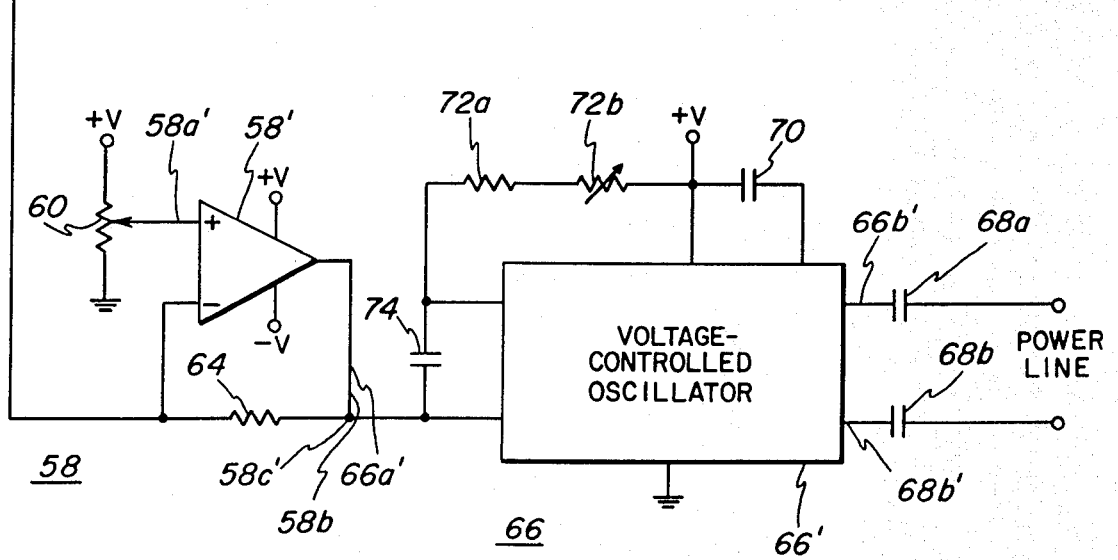

4,438,519

METHODS, AND APPARATUS, FOR TRANSMITTING HIGH-BIT-RATE DIGITAL DATA IN POWER LINE COMMUNICATION MEDIA HAVING HIGH HARMONIC NOISE CONTENT

BACKGROUND OF THE INVENTION

The present application is directed toward digital data communications and, more particularly, to novel methods and apparatus for transmitting digital data at a high bit rate in a power line communication system having high harmonic noise content in the power line communications media thereof.

It is often desirable to be able to communicate digital data over existing media, such as the branch circuits of the commercial power means within a building. The transmission of a modulated carrier utilizing the power line media, or power line carrier (PLC) communications, presents unique problems, because of the non-Gaussian noise voltage on the medium. This medium is typically corrupted by noise spikes occurring at intervals equal to the reciprocal of the power line frequency (60Hz. in the United States), i.e. by noise spikes which occur at 1/60 second intervals. These spikes give rise to a noise spectrum having power line frequency (60Hz.) harmonics, in addition to Gaussian "white" noise. The power line frequency harmonics decrease the signal-to-noise ratio which might otherwise be obtained, and often lead to unacceptably high error rates or a total communications breakdown. It is often not feasible to overcome the harmonic noise problem by impressing higher carrier signal voltages upon a power line communications medium. This may be due in part to legal restrictions imposed by public regulatory agencies, by adverse effect upon equipment drawing power from the branch power line, or by causing unacceptable interference levels between adjacent communication systems utilizing the same medium.

One suggested alternative for alleviating power line frequency harmonic problems has been through the use of spread spectrum techniques, in which the modulation process spreads the communication signals energy over a transmission bandwidth much larger than the original signal bandwidth. A suitable demodulator selectively sums up the signal energy present in the transmission bandwidth, and rejects the noise, whereby an improved signal-to-noise ratio is obtained. Spread spectrum modulation, and particularly modulation of the chirp frequency-modulation form, as described in *Spread Spectrum Systems* by Robert C. Dixon (Wiley-Interscience, 1976), has been suggested for such use. In the typical chirp spread spectrum system, relatively complex receiver and transmitter structures are required to transmit a signaling waveform changing initially in a first direction from a first frequency to a second frequency for a logic one bit and in the opposite direction from the second frequency to the first frequency for a logic zero bit. This chirp waveform presents special complications with respect to bit synchronization and additional equipment is required for providing data bit and clock synchronization at the receiving end. Additional problems may occur due to the frequency discontinuities appearing when transmitting a string of identical bits. A method for modulating a power line communication carrier to transmit high-bit-rate digital data modulated power line carrier signals and provide relatively high power line harmonic noise immunity, while providing relatively simple receiver and transmitter structures and also providing bit synchronization between system receiver and transmitter, is therefore highly desirable.

BRIEF SUMMARY OF THE INVENTION

In accordance with the invention, the output frequency of a transmitter in a power line communication system is controlled to have an instantaneous frequency which is at a predetermined center frequency at the beginning, middle and end of each bit time interval. The instantaneous transmitter frequency varies to a maximum frequency and a minimum frequency once within each bit time interval, with the presence of maximum and minimum, or minimum and maximum, frequencies at the respective one-quarter and three-quarter times in the bit-time-interval respectively occurring for a first binary condition and a second binary condition. Advantageously, substantially linear changes in instantaneous transmitted frequency with time occur during each quarter of the bit time interval. Cancellation of the effects of power line frequency harmonics is provided by the resulting triple-ramp waveform in each bit time interval.

In one presently preferred embodiment, a transmitter for providing the triple-ramp chirp frequency-modulated waveform, to the power line communications media, utilizes a parallel-in/serial-out shift register clocked at four times the input data rate, and a subsequent integrator to provide a triple-ramp analog voltage to the frequency control input of a voltage-controlled oscillator, having the chirp waveform at the output thereof coupled with the power line. Suitable level shifts, waveform inversion and amplification are utilized to provide a transmitter which may be realized with as few as three standard integrated circuits. One presently preferred embodiment of receiver, for recovering both data and clock pulse information from power line communication media on which the triple-ramp chirp frequency-modulation waveform is present, utilizes a phase-locked loop having the output thereof pass through an integrator and subsequent comparator for recovering the binary data, with the integrator output being full-wave rectified and threshold-detected to provide the bit timing clock pulses. Advantageously, amplification, soft-limiting and band pass-filtering pre-processes the power line communication signal prior to introduction to the phase-locked loop. Apparatus in accordance with the present invention will provide a high degree of power line frequency harmonic rejection with relatively simple and lowcost equipment, and will also provide easy bit synchronization between receiver and transmitter.

Accordingly, it is one object of the present invention to provide a novel method for modulating a power line communications carrier to transmit high-bit-rate digital-data-modulated power line carrier signals for use in power line carrier communication systems having high harmonic noise content therein.

It is another object of the present inventor to provide novel transmitter and receiver apparatus using the novel method.

These and other objects of the present invention will become apparent upon consideration of the following detailed description, when read in conjunction with the drawings.

BRIEF DESCRIPTION OF THE DRAWINGS

FIGS. 2 and 2a are respective block and schematic diagrams of a transmitter utilized in the method of the present invention;

DETAILED DESCRIPTION OF THE INVENTION

Figure 1:
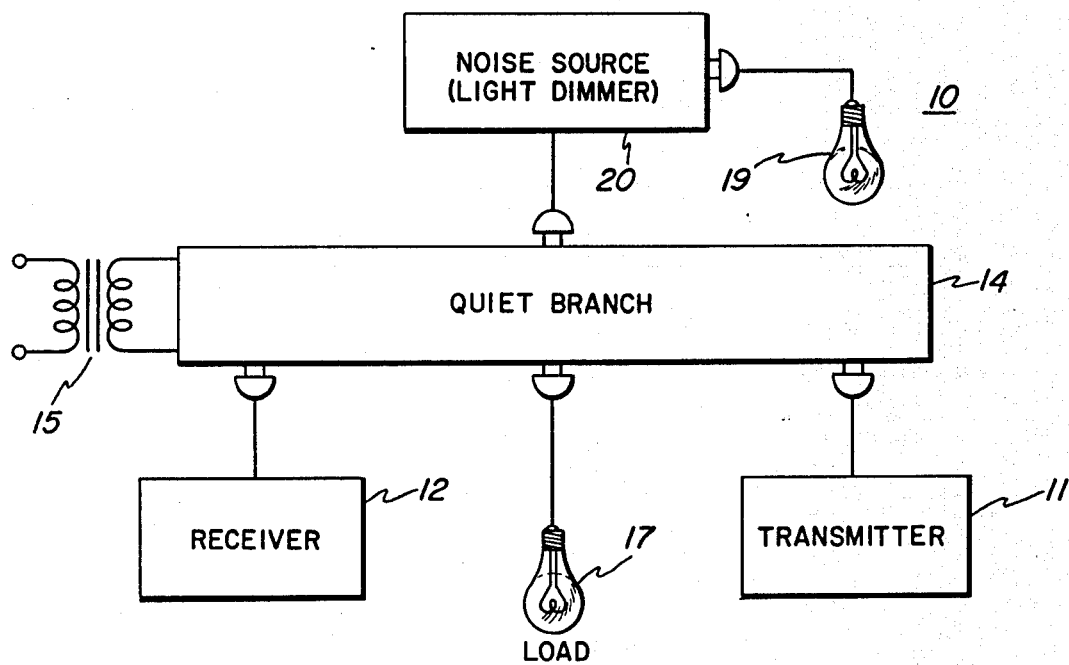
FIG. 1 is a simplified block diagram of a power line communications system, and the load and noise sources having an effect thereon, and useful in understanding in the principles of the present invention.

Referring initially to FIGS. 1, 1a, 1b and 1c, a power line communications system 10 includes a transmitter 11 for transmitting digital data to a receiver 12, utilizing a power line branch circuit 14 as a transmission media. Typically, branch 14 includes all circuits connected to the secondary winding of a power distribution transformer 15. Thus, branch 14 may be a 220 volt branch serving one or more residences, from the secondary winding of a step-down distribution transformer, or may be all of the distribution wiring within an entire office building, at a somewhat higher voltage (of about 440 volts) where the commercial building power is provided by the secondary winding of a single step-down distribution transformer. The primary purpose of branch 14 is to provide energizing electrical power, at the power line frequency, to at least one load 17, such as electric lights, motors and the like. The secondary purpose of branch 14 is to act as the communications system medium. This secondary purpose is hindered by other loads 19, which may be controlled by apparatus 20, such as a light dimmer, motor speed controller and the like, which act not only as a source of Gaussian "white" noise but also as a source of harmonics of the power line frequency (typically being 60Hz. in the United States). The power line harmonics decrease the signal-to-noise ratio otherwise obtainable in the power line communications (PLC) system, and often lead to unacceptably high bit-error rates, and, occasionally, to a complete communications breakdown between transmitter 11 and receiver 12.

Figure 1A:
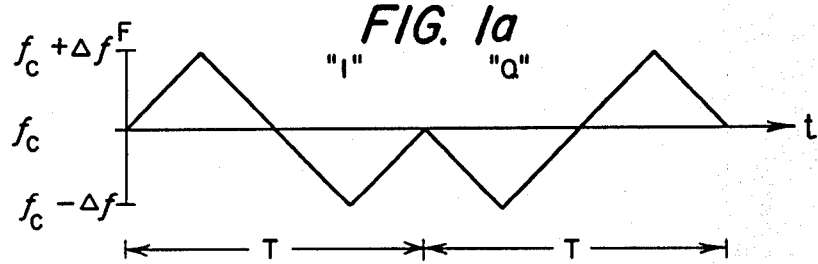
FIGS. 1a and 1b are coordinated frequency and control voltage waveforms for transmitting bits of digital data in accordance with the methods of the present invention.
Figure 1B:
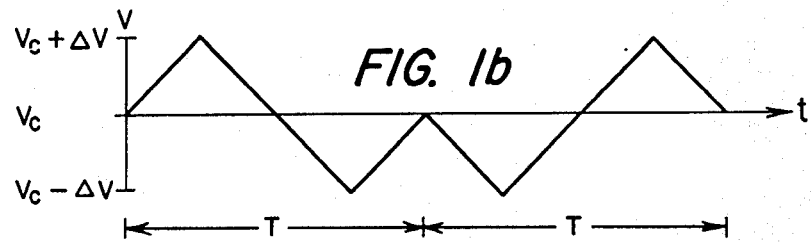
Figure 1C:
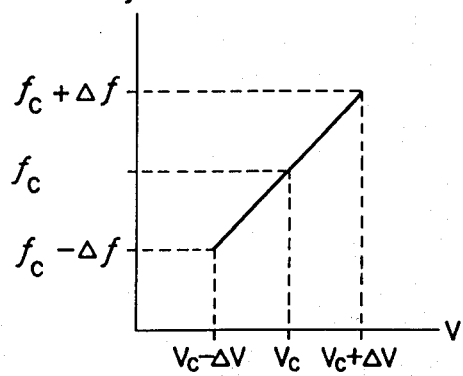
FIG. 1c is a graphical representation of the relationship between VCO control voltage and frequency.
Figure 2:
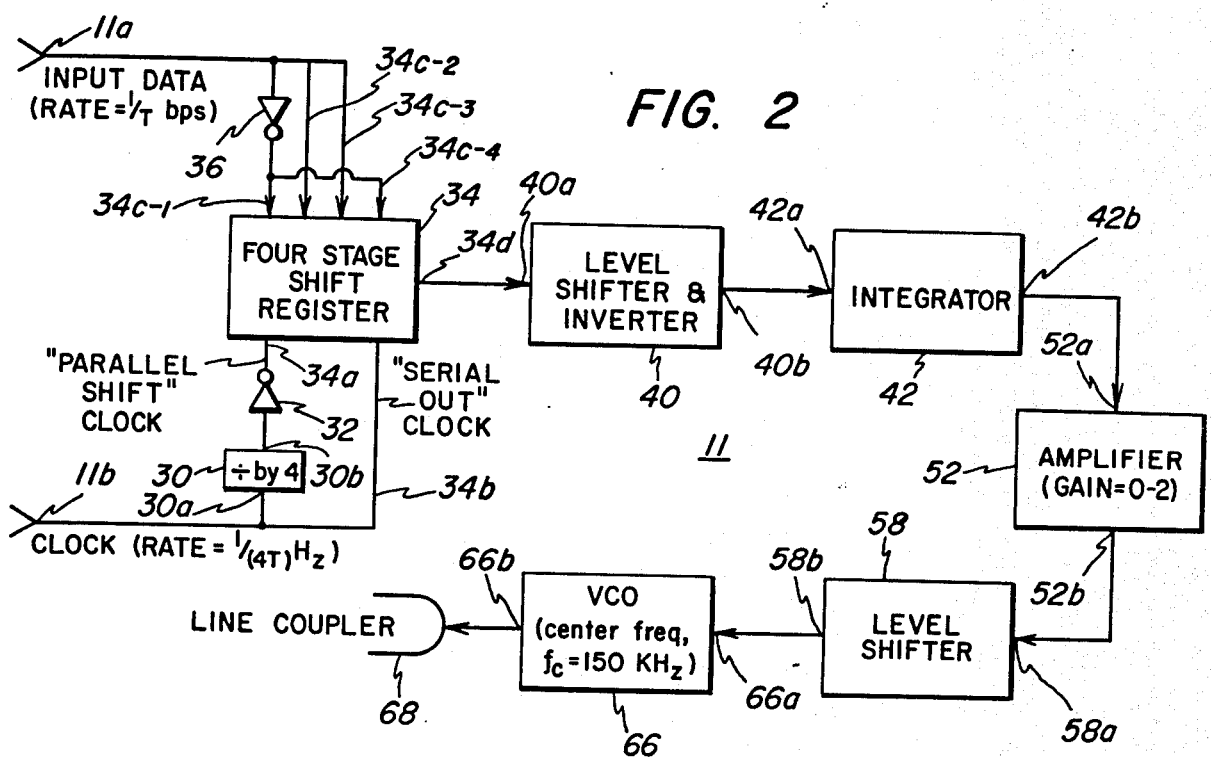

In accordance with the invention, the output frequency F of transmitter 11 is controlled to have the chirp frequency relationship shown in FIG. 1a, by an input frequency control voltage V waveform shown in FIG. 1b, with the relationship shown in FIG. 1c. The frequency control Voltage V is at a center value $V_c$ and the transmitter frequency F is at a center frequency $f_c$ at the start, middle, and end of each bit time interval T.

A binary one data bit is transmitted, in a bit time interval T, by causing the frequency control voltage V and the frequency F to substantially linearly increase from the center voltage $V_c$, and the center frequency $f_c$, respectively, to a maximum control voltage $V_c + \Delta V$ and maximum frequency $f_c + \Delta f$, respectively, in the initial one-quarter of the bit time interval. Thereafter, the control voltage and frequency are both substantially linearly decreased in the middle one-half of the bit time interval, to a minimum control voltage $V_c - \Delta V$, with the instantaneous carrier frequency sweeping down to a minimum frequency $f_c - \Delta f$. Thereafter, in the final one-quarter of the binary one bit time interval, the control voltage and instantaneously transmitted frequency are both substantially linearly increased respectively to the center voltage $V_c$ and the center frequency $f_c$.

A binary zero data bit is transmitted in a mirror-image fashion, in another bit time interval T. The binary zero data bit starts at the center voltage $V_c$ and instantaneous center transmitter frequency $f_c$ and is transmitted by: decreasing the frequency control voltage V substantially linearly to the minimum value $V_c - \Delta V$, with a substantially linear decrease in instantaneous frequency to the minimum frequency $f_c - \Delta f$, in the first one-quarter of the bit time interval; then substantially linearly increasing both the control voltage and the associated instantaneous frequency from the respective minimum voltage $V_c - \Delta V$ and minimum frequency $f_c - \Delta f$, to the maximum control voltage $V_c + \Delta V$ and the associated maximum frequency $f_c + \Delta f$, in the middle one-half of the bit time interval; and, in the final one-quarter of the bit time interval, substantially linearly decreasing both the control voltage and instantaneous transmitted frequency from the maximum values thereof to the center values $V_c$ and $f_c$, respectively. It should be understood that particular apparatus may require that the control voltage have an inverse relationship to instantaneous frequency, i.e. a decrease or an increase in control voltage respectively resulting in an increase or a decrease, respectively, in instantaneous frequency. It should also be understood that the positive logic waveforms described above may be reversed to transmit negative logic data, if required by a specific PLC system.

By frequency modulating the transmitter output in this manner, relatively simple apparatus structure may be utilized for transmitter 11 and receiver 12, while obtaining a high degree of power line frequency harmonic cancellation to reduce the effects of harmonic noise. Use of this chirp waveform also provides for easy tracking of the instantaneous carrier frequency at the receiver, as there are no abrupt frequency jumps (as found in many other forms of chirp modulation). Further, this chirp modulation form removes the necessity for bit synchronization between receiver and transmitter, as the receiver can provide both the data bit stream and bit timing clock pulses, responsive to the frequency-modulation chirp received from the transmitter.

Referring now to FIGS. 2, 2a, and 3a-3e, one presently preferred embodiment of transmitter 11 is shown in block and schematic diagram form. A transmitter data input 11a is provided (by data circuitry not shown) with binary data, at a rate of 1/T bits-per-second, to be transmitted. A clock waveform, at a rate of 1/(4T) pulses-per second, is simultaneously provided by the data circuitry (not shown) at a clock input 11b. The input clock waveform is applied to the input 30a of a divide-by-four means 30, which may be provided by a standard CMOS 4027 dual flip-flop logic integrated circuit and the like. The waveform at the output 30b of divide-by four means 30 is a train of clock pulses at a 1/T pulse-per-second rate. This waveform is inverted by a first inverter 32 and applied, as a first clock CLK1 signal, to the input-parallel-shift P/S clock input 34a of a four-bit parallel-shift-in, serial-shift-out register 34, which may be a standard CMOS 4035 integrated circuit and the like. The clock waveform at input 11b is connected as a second clock CLK2 signal to a serial-output clock CLK input 34b of the four-stage shift register 34. Shift register 34 has one data input 34c-1 through 34c-4 for each of the four stages thereof. The first and fourth stage data inputs 34c-1 and 34c-4 are connected together to the output of a second inverter 36 having an input connected to transmitter data input 11a. Inverter 36 may be formed by connecting together both inputs of a 2-input NAND gate, such as forms a portion of a standard CMOS 4011 integrated circuit and the like. Data input 11a is directly connected to the shift register second and third stage inputs 34c-2 and 34c-3. If a CMOS 4035 shift register is used, the shift register Q3 output 34d is connected to the input of an auxiliary inverter 38, which may be another portion of the CMOS 4011, and the output thereof is connected to both the J and K inputs of the register first stage, for proper serial output shift operation.

Shift register output 34d is also connected to the input 40a of a level shifter and inverter means 40. Means 40 changes the logic level voltages from the shift register output (which voltages are typically about zero volts for the logic zero level and about +volts, the operating potential applied to the shift register, for the logic one level) to a waveform of similar shape, but of different logic zero and logic one levels, as required at the input 42a of an integrator means 42. The waveform at the integrator means output 42b is a triangular waveform having substantially linearly changing voltage segments during each sequential one-quarter portion of the big time interval T or T'.

The level shifter and inverter means 40 and integrator means 42 may be provided (Fig. 2a) by a pair of operational amplifiers 40' and 42'. The non-inverting +input 48' of the first operational amplifier is connected directly to the shift register output 34d. The inverting −input 40b' of the first operational amplifier is connected to the wiper arm of a potentiometer 44, itself connected between positive operating potential +V and ground potential. The first operational amplifier operates as a level shifter and has an output 40c' connected across a potentiometer 46, having its wiper arm connected through a resistance 48 to the inverting −input 42a' of second operational amplifier 42'. The non-inverting +input 42b' of the second operational amplifier is connected to ground potential. The second operational amplifier is an inverting integrator and has an output 42c' connected back to the non-inverting input 42a' thereof through a feedback network 50 comprising an integrating capacitor 50a and a relatively high resistance element 50b in parallel connection.

The integrator means output 42b is connected to the input 52a of an adjustable gain amplifier 52 utilizing another operational amplifier 52'. Amplifier means 52 has an adjustable gain between zero and −2. A non-inverting +input 52a' is connected to ground potential, while an inverting −input 52b' is connected through an input network 54, comprised of a resistance element 54a in series with a capacitance element 54b, to integrator means output 42b. The operational amplifier output 52c' is connected through a gain-setting variable resistance 56 to the inverting-input 52b'. Amplifier output 52b is taken from operational amplifier output 52c' and is connected to the input 58a of a level shifter means 58. The non-inverting +input 58a' of the operational amplifier is connected to the wiper arm of a potentiometer 60, itself coupled between positive operating potential +V and ground potential. An inverting −input 58b' is connected through a series input resistance 62 to level shifter input 58a connected to amplifier output 52b. A feedback resistance 64 is connected between inverting −input 58b' and operational amplifier output 58c', at which the level shifter means output 58b is provided. Each of operational amplifiers 40', 42', 52' and 58' may be individual operational amplifiers, such as available in the standard type 741 integrated circuit operational amplifier, or may be part of a multiple-operational amplifier integrated circuit, such as the dual-amplifier type 747 or one of the many standard quad-amplifier integrated circuits. All operational amplifiers are connected between sources of positive and negative operating potential +V and −V.

The level shifter means output 58b is connected to the control voltage input 66a of a voltage controlled oscillator (VCO) means 66. The frequency of the waveform at VCO output 66b is set to a desired resting center frequency $f_c$, e.g. on the order of 15KHz. in the illustrated embodiment, and is varied from that center frequency responsive to the voltage at control output 66a. Illustratively, VCO means 66 may be provided by VCO integrated circuit 66', such as the standard LM566 integrated circuit and the like, having a control input 66a', controlling the frequency at a pair of outputs 66b' and 66b''. The VCO outputs may be coupled to two wires of the branch power line via a line coupler 68, which may include a pair of isolation capacitors 68a and 68b. Where the particular LM566 VCO integrated circuit is used, a center-frequency-determining capacitive element 70 and resistance elements 72a and 72b are connected thereto, with the value of variable resistance 72b being adjusted to achieve the desired center frequency. A slew-rate-determining capacitive element 74 is also utilized.

The operation of transmitter 11 will now be considered, with the transmitter sending a logic-one data bit in time interval T and a logic-zero data bit in the following bit time interval T'. The data input 11a receives a logic one level at time $t_0$, which logic one level continues for the entire first time interval T, until the start, at time $t_0'$, of the next time interval T'. At time $t_0'$, and throughout the second bit time interval T', data input 11a is at a logic zero level. Thus, at time $t_0$, the input logic one level is provided at second and third bit shift register 34c-2 and 34c-3; the logic one level is inverted and provided as a logic zero level at first and fourth bit inputs 34c-1 and 34c-4 of the shift register. The clock signal at input 11b is synchronized with the transitions of the data at input 11a, whereby the proper clock transition occurs at the "parallel shift" clock input 45a of the shift register at time $t_0$, loading the data inputs $D_0$–$D_3$ of the fourth shift register stages. Immediately thereafter, the first of four clock pulses (occuring in each bit time interval T or T') causes the "serial out" clock input 34b to be activated and provides the logic level, as contained in the fourth shift register stage, at shift register output 34d. Since that stage was initially set to a logic zero level, the shift register output voltage V34d (FIG. 3a) goes to a logic zero level in the first one-quarter of the bit time interval T, i.e. between time $t_0$ and time $t_1$. Thereafter, the logic-one levels of the third and second stages and the logic-zero level of the first stage are sequentially respectively shifted to output 34d, and the output voltage V34d is sequentially at respective levels of $+V$, $+V$ and 0 volts in the respective second, third and fourth quarters of bit time intervals T, i.e. between times $t_1$ and $t_2$, between times $t_2$ and $t_3$ and between times $t_3$ and $t_0'$.

The logic zero data bit at input 11a, appearing at $t_0'$ at the commencement of bit time interval T'causes the four shift register stage inputs to respectively receive logic one, logic zero, logic zero and logic one levels, when the parallel-shift clock input 34a is next enabled. Immediately thereafter, the four serial output clock input 34b clock pulses shift the stage contents to the output, whereby output voltage V34d has respective levels of $+V$, 0, 0 and $+V$ in the respective sequential quarters of the bit time interval T', i.e. between times $t_0'$ and $t_1'$, between times $t_1'$ and $t_2'$, between times $t_2'$ and $t_3'$, and between times $t_3'$ and $t_0''$.

Figure 3A:
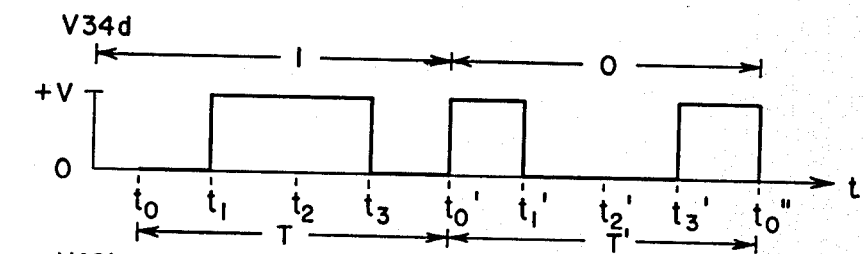
FIGS. 3a-3e are a set of coordinated waveforms generated in the presently preferred transmitter embodiment of FIG. 2.
Figure 3B:
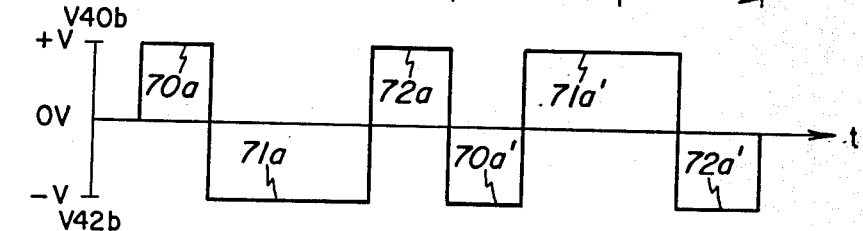
Figure 3C:
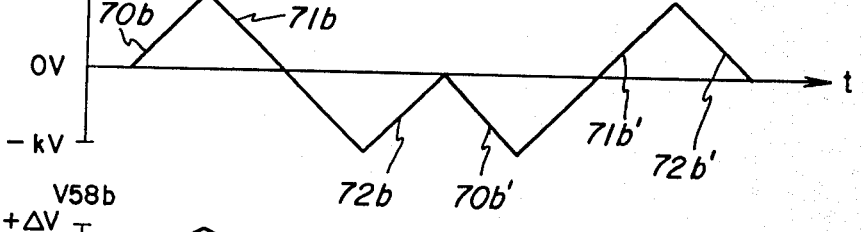

If integrator means 42 was a single-ended integrator, which type of integrator means is within the scope of the present invention, the register output voltage might not have to be shifted in level, dependent upon the control voltage requirements of VCO means 66. However, the illustrated double-ended integrator requires an input signal having a D.C. level of zero volts. Accordingly, the inverted and shifted voltage at the output of means 40 is, as shown in FIG. 3b, the level-shifted inverse of the waveshape of FIG. 3a, whereby at the time $t_0$, the level shifter and inverter means output voltage V40b obtains the $+V$ level, shifts to the $-V$ level at time $t_1$ and changes to the $+V$ level at time $t_3$. At the start of second bit time intervals T', the level shifter and inverter means output voltage V40b goes to the $-V$ level, changing to the $+V$ level between times $t_1'$ and time $t_3'$, at which latter time the level changes to the $-V$ level and remains thereat until the end of the second bit time interval, at time $t_0''$.

The waveform of FIG. 3b is integrated in integrator means 42 and appears as the output voltage V42b (FIG. 3c), having an instantaneous zero magnitude at the start, middle, and end times of each bit time interval, i.e. $t_0$, $t_2$, $t_0'$, $t_2'$, $t_0''$, etc. Thus, from the instantaneous zero magnitude output at time $t_0$, the positive input voltage 70a, during the first one-quarter of the first bit time interval, causes the integrator output voltage to be a substantially linearly increasing ramp voltage portion 70b, attaining a maximum peak value of $+kV$ volts at time $t_1$. As the integrator input voltage changes to $-V$ volts at time $t_1$ the integrator output voltage (portion 71b) commences a substantially linear decrease thereat and continues substantially linearly increasing throughout the total time interval $t_1$-$t_3$, during which time interval the input voltage 71a remains at a negative value. Therefore, waveform portion 71b substantially linearly decreases from a peak magnitude of $+kV$ at time $t_1$, to zero volts at time $t_2$, and to a negative peak magnitude $-kV$ at time $t_3$. Thereafter, the input voltage inverts, in portion 72a, to the positive magnitude, and the integrator output voltage substantially linearly increases, in portion 72b, until a zero magnitude output is reached at $t_0'$ at the end of the bit time interval T. Similarly, the integrator output voltage for a logic-zero data bit starts at the zero -volt level at time $t_0'$, substantially linearly decreases (waveform portion 70b') to the $-kV$ volt peak at time $t_1'$, responsive to the negative integrator input voltage 70a'then substantially linearly increases (portion 71b') to zero volts at time $t_2$, and to $+kV$ volts at time $t_3'$ responsive to the positive input voltage 71a' during that middle half of the second bit time interval, and finally substantially linearly decreases (portion 72b') to zero amplitude at time $t_0''$, responsive to the negative voltage 72a' during the last quarter of the second bit time interval.

Figure 3D:
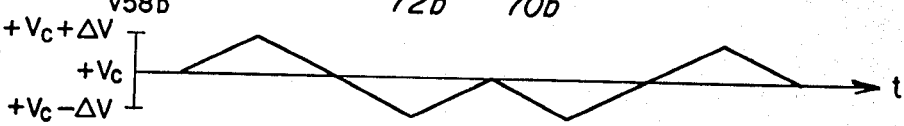
Figure 3E:
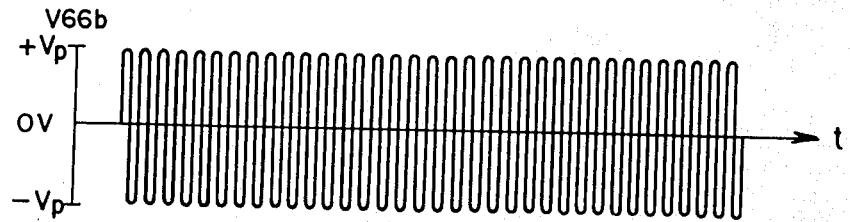
Figure 4:
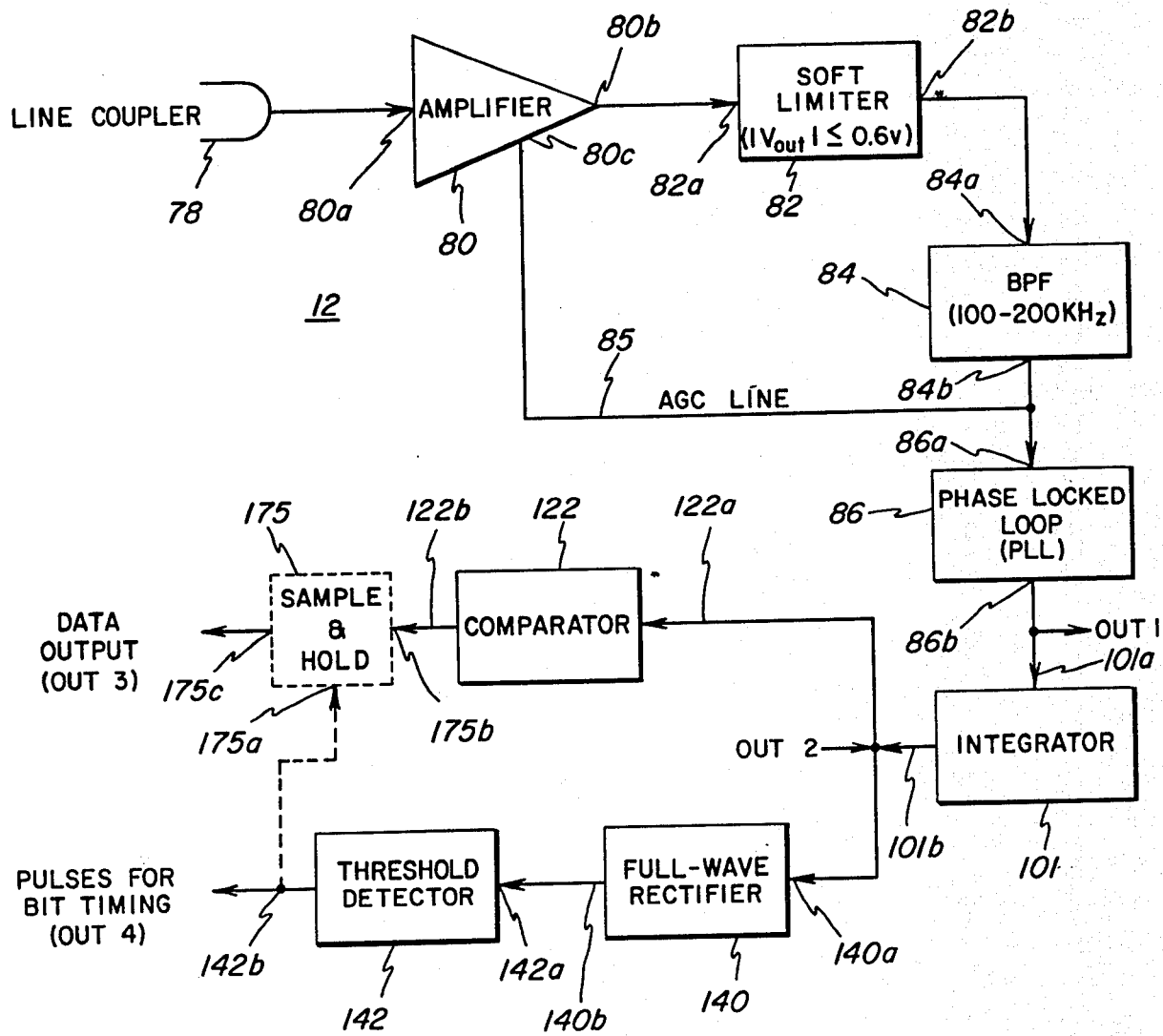
FIGS. 4 and 4a are respective block and partial schematic diagrams of one presently preferred embodiment of a receiver for recovering digital data from power line communications media, transmitted in accordance with the methods of the present invention.
Figure 4A:
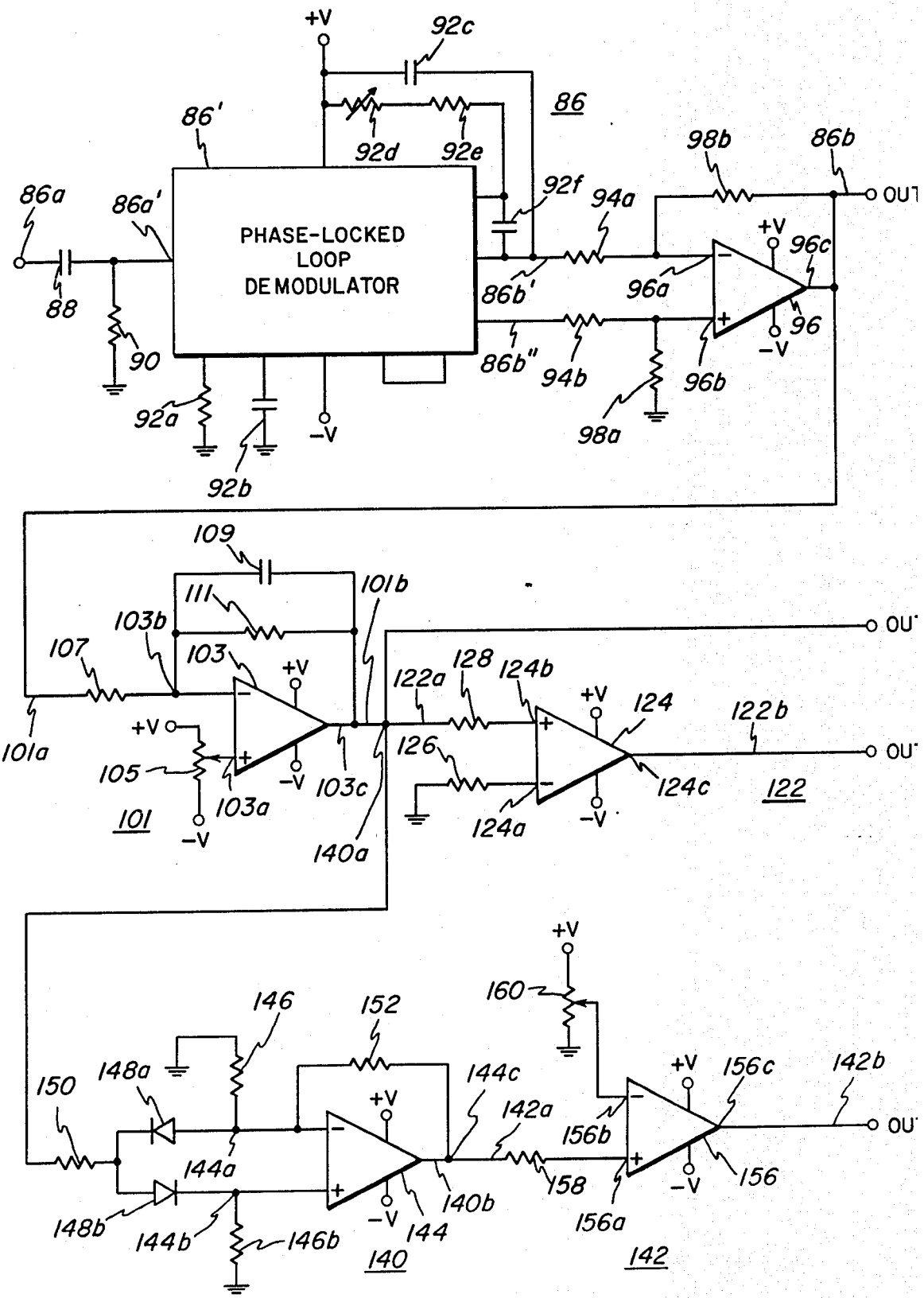

The triple-ramp integrator output waveform thus formed during each bit time interval is amplified in amplifier means 52 and again level-shifted, in means 58, to provide the VCO control voltage input V58b of FIG. 3d. This control voltage waveform has the center frequency control voltage $V_C$ magnitude at the beginning, middle, and end of each bit time interval, with substantially linear excursions to the maximum control voltage $V_C + \Delta V$ and minimum control voltage $V_C - \Delta V$ magnitudes at different ones of the one-quarter and three-quarter times in the bit time interval. Responsive thereto, the substantially sinusoidal VCO means output waveform voltage V66b, of FIG. 3e, is generated. While not immediately apparent from FIG. 3e, the output waveform frequency is at the center frequencies $f_c$ at the beginning, mid-point and end of each bit time interval and is at a maximum frequency $f_c + \Delta f$ at the one-quarter bit-time-interval point in a logic-one data bit time interval, or at the three-quarters bit-time-interval point in a logic-zero bit time interval, and is at the minimum frequency $f_c - \Delta f$ at the three-quarters bit-time-interval point in a logic-one bit time interval or at the one-quarter bit-time-interval point in a logic-zero bit time interval, with substantially linear frequency changes therebetween, as shown in FIG. 1a.

Referring now to FIGS. 4, 4a and 5a-5b, one presently preferred embodiment of a frequency-chirp PLC receiver 12 receives the frequency-modulated chirp waveform from power line branch 14, by means of a line coupler 78. The received chirp PLC signal is applied to the input 80a of an amplifier means 80; dependent upon a particular type of amplifier 80 selected, line coupler 78 may utilize the same type of capacitive coupler 68 as utilized at the transmitter, or may utilize any of the wide variety of other coupler types known to the art. Amplifier 80 may be an automatic-gain-controlled amplifier if desired, with the gain set by a signal at control input 80c, and on line 85. The amplified received signal at amplifier means output 80b is applied to the input 82a of a soft limiter means 82. The frequency-modulated signal at soft limiter means output 82 has an absolute magnitude which never exceeds the limiting level, e.g. about 0.6 volts in the illustrated embodiment whereby the energy in any "noise" spike is reduced. The amplified and limited received signal is applied to the input 84a of a band-pass filter (BPF) means 84, having a pass band, in the illustrative embodiment in which a center frequency $f_c$ of 150KHz. is used, between 100KHz. and 200KHz, whereby out-of-band harmonics and white noise are rejected.

Figure 5A:
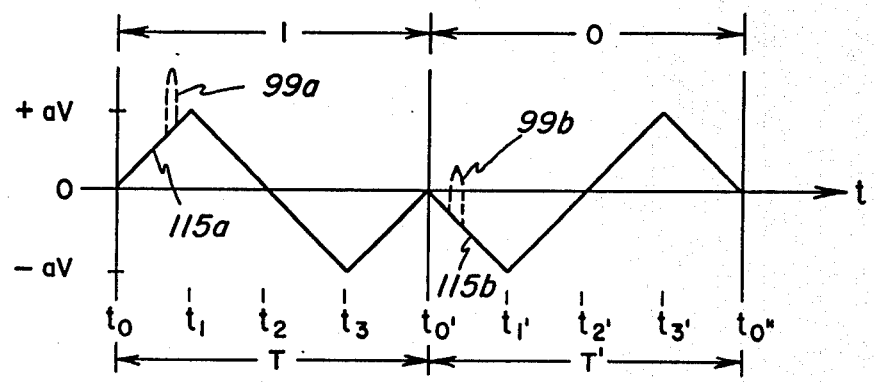
FIGS. 5a-5d are a set of coordinated waveforms occuring in the receiver of FIG. 4 and useful in the understanding the principles of the operation thereof.
Figure 5B:
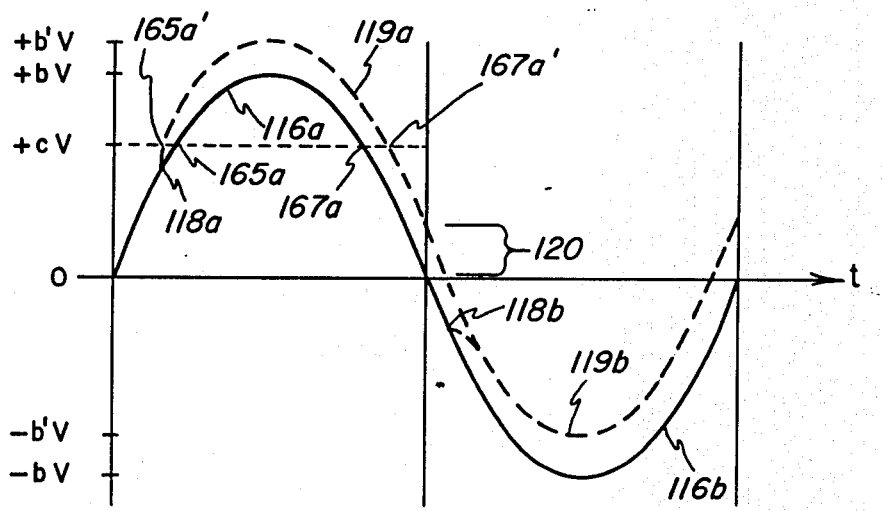

The band-pass filtered, limited and amplified signal at filter means output 84b is applied to the input 86a of a phase-locked loop (PLL) means 86. The phase-locked loop frequency control voltage is connected to the PLL means output 86b and is available at a first receiver output OUT1. In the illustrated receiver embodiment, phase-locked loop means 86 utilizes a phase-locked loop integrated circuit 86' such as the standard LM 556 integrated circuit and the like. The bandpass-filtered signal is applied through a coupling capacitance 88 to the loop input 86a, with a terminating resistance 90 being connected between the PLL integrated circuit input 86a' and ground potential. Positive and negative operating potentials +V and −V are connected to PLL integrated circuit 86' and such biasing, stabilization and center-frequency-determining components 92a–92f as required by the particular phase-lock loop means utilized, are coupled thereto. A pair of differential loop control outputs 86b' and 86b" are respectively coupled through series resistances 94a and 94b to the respective inverting −input 96a and non-inverting +input 96b of a differential amplifier 96. Gain-setting resistances 98a and 98b are respectively coupled from input 96b to ground potential and from input 96a to amplifier output 96c, from which output the PLL means output 86b and the receiver first output OUT1 are taken. The voltage at phase lock loop means output 86b is, as shown in FIG. 5a, ideally recovered as the same waveshape as the waveform (FIG. 3d) applied to the transmitter VCO means control input, although the peak amplitude, e.g. aV, thereof may be different. The PLL means output waveform will ideally have a zero magnitude at the beginning, midpoint and end of each bit time interval, identical to the transmitter frequency control waveform. In the non-ideal case, a spike 99 may appear on the PLL output waveform due to power line frequency harmonics (note the substantially constant time, after the start of each bit time interval, at which one of spikes 99a and 99b appear). However, due to the soft-limiting action of means 82, the peak amplitude of a spike 99 is not much greater than the peak amplitude of a desired output waveform from means 86.

The triple-ramp waveform from PLL means output 86b is applied to the input 101a of an integrator means 101. This subcircuit is realized utilizing an operational amplifier 103 having a non-inverting +input connected to the wiper arm of an off-set-adjusting potentiometer 105, connected between positive and negative operating potentials +V and −V. An inverting input 103b is connected through an input resistance 107 to integrator means input 101a. An integrating capacitor 109 is connected between inverting input 103b and amplifier output 103c, and is shunted by a relatively large-valued resistance 111. Amplifier output 103c is connected to integrator means output 101b, from which a second receiver output OUT 2 is taken.

The integrator output waveform (FIG. 5b) is ideally a half-cycle of a sinusoid having a period 2T, and having a substantially zero amplitude at the beginning and end of each bit time interval. The polarity of the half-cycle integrator output waveform is established by the polarity of the PLL means output ramp in the initial one-quarter of each bit-time-interval. Thus, when a logic-one data bit is received, the ramp waveform portion 115a, in the initial quarter of the bit-time-interval, is increasing in the positive direction, whereby the associated integrator means output waveform is a positive polarity sinusoid half-cycle waveform 116a. Similarly, when a logic-zero data bit is received, the ramp waveform 115b, in the initial quarter of the bit-time-interval, is of negative polarity, whereby the corresponding integrator means output waveform is a negative polarity half-cycle sinusoidal portion 116b. In the non-ideal (and more general) case, a noise spike received during the bit time interval will merely distort the amplitude, but n( the polarity, of the integrator means output wavefor 116. Thus, if the ideal case provided a peak amplitude ±bV, the presence of a harmonic spike 99 would, most, change the peak magnitude to +b'V or −b'\ dependent upon the polarity and time of occurren( during each bit time interval, of the spike; the magr tude of the integrator output waveform may be oth than a substantially zero magnitude at the start or end a bit time interval. Illustratively, with spike 99a occu ring during the first quarter of a bit-time-interval with received logic-one data bit, and with spike 99a being positive polarity, the amplitude of the integrator outp waveform abruptly increases at point 118a, at the o currence of spike 99a and, because of the positive spil polarity, has a somewhat greater amplitude 119a for tl remainder of the bit time interval. If another spike is n received, the positive offset 120, at the beginning of tl next bit-time-interval T'merely provides a positive o: set to the negative-polarity sinusoidal half-cycle of tl integrator means output waveform 119b in the logi zero data bit time interval T'. Similarly, if a spike 99b positive polarity is received in the first quarter of tl logic zero data bit time interval T', the zero-offset sinu oid portion 116b is modified by the spike energy portion 118b, and has a less negative peak amplitu( −b'V, corresponding to a positive offset portion 11$ It will, however, be seen that the integrator means o\ put waveform is predominately of positive polarity f a logic one data bit, and is predominately of negati polarity for a logic zero data bit.

Figure 5C:
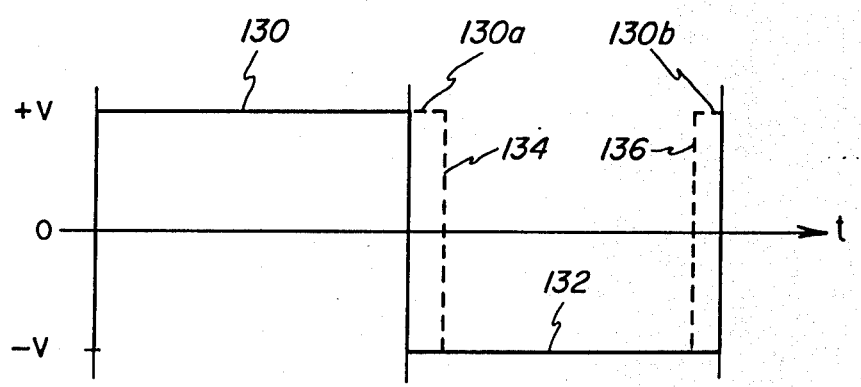

By comparing the integrator means output wavefo1 against a substantially zero magnitude voltage, the sta of the transmitted data bit can be recovered. Accor ingly, the integrator means output 101b is connected the input 122a of a comparator means 122. The comp; ator means utilizes an operational amplifier 124 havi an inverting-input 124a connected to a resistance 126 ground potential, and a non-inverting +input 12 connected through a substantially identical resistan 128 to comparator input 122a. As feedback is not pr ent to either input from amplifier output 124c, the o put 122b of the comparator means (taken from amplif output 124c and provided as a receiver data outp OUT 3) will be substantially at the +V operating p tential magnitude if the amplitude of the signal at t comparator input 122a is greater than zero, and will substantially at the negative operating potential −V i a comparator input 122a signal amplitude less than ze as shown in FIG. 5c. Thus, in logic-one bit time inter T, a positive output level 130 is provided at the receiv data output, while a negative output level 132 is pi vided in the logic-zero bit time interval T', in the id case. In the non-ideal illustrated case, because of t positive offset 120, the data output remains at the po tive level 130a for a small interval at the beginning subsequent bit time interval T'and then falls, at ed 134, to the negative polarity output level 132. Similar because the non-ideal waveform portion 119b atta the zero level at some time before the end of bit ti interval T', the recovered data output has a rising ec 136 and has a short positive polarity portion 130b imn diately prior to the end of the bit time interval.

The clock pulses for bit timing, which are to be p vided at another receiver output OUT 4, are provic by utilizing a full-wave rectifier means 140 and a thre old detector means 142. Integrator means output 101, connected to the input 140a of the full-wave rectif means. The full-wave rectifier utilizes an operational amplifier 144 having both the inverting −input 144a and the non-inverting +input 144b respectively connected to ground potential through one of a pair of substantially equal resistance elements 146a and 146b. A pair of diodes 148a and 148b are connected in series between inputs 144a and 144b, with the anode of diode 148a connected to input 144a and the cathode of diode 148b connected to input 144b. The junction between the two diodes is connected through an input resistance 150 to the rectifier means input 140a. A feedback resistance 152 is connected from inverting input 144a to the operational amplifier output 144c, which forms the full-wave rectifier output 140b. Threshold detector 142 utilizes another operational amplifier 166, having a non-inverting +input 156a connected through an input resistance 158 to threshold detector input 142a, which is itself connected to the rectifier means output 140b. A potentiometer 160 is connected between positive operating potential +V and ground potential, and has the wiper arm thereof connected to an inverting −input 156b of the operational amplifier. No feedback is used around operational amplifier 156, and the output 156c thereof is directly connected to the threshold detector means output 142b, from which output OUT 4 is taken.

Figure 5D:
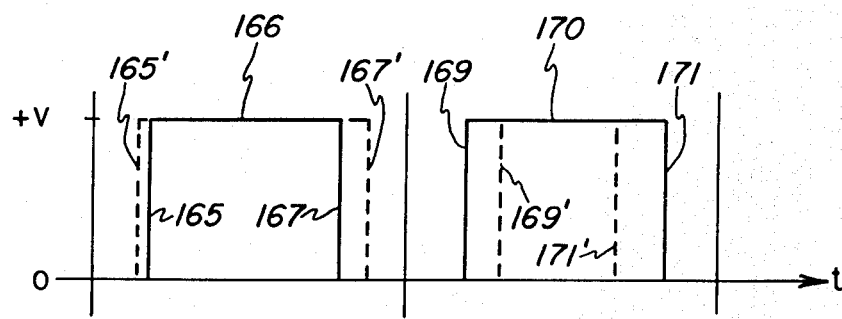

The threshold detector output (FIG. 5d) will, if potentiometer 160 is set to a level of +cV (see FIG. 5b), be at the zero amplitude at the start and end of each bit time interval, and will have a rising edge 165, to a positive value 166 (substantially equal to the positive operating potential +V magnitude), when the waveform 116a reaches the threshold voltage +cV at point 165a. The positive pulse will have a trailing edge 167 when the integrator means output waveform 116a falls below the threshold voltage at point 167a. In the non-ideal case, wherein pulse 99a illustratively appears before the integrator means output waveform reaches the trigger voltage +cV, the actual integrator means output waveform 119a reaches the threshold voltage at an earlier point 165a', whereby the actual leading edge 165' occurs slightly earlier than in the ideal case, but still well after the start of the bit time interval. Similarly, the crossing, in the negative-going direction, of non-ideal waveform 119a occurs at a later point 167a', whereby the actual falling edge 167' occurs slightly later than the ideal trailing edge 167, but still well before the end of the bit time interval T. In a logic-zero bit time interval T', the action of full-wave rectifier 140 inverts the negative-polarity integrator means output, whereby threshold detector 142 receives a positive-polarity sinusoidal portion. In the ideal case, rising edge 169 would occur at the same time into the bit time interval as ideal rising edge 165 occurred in its own bit time interval, with the threshold detector means output 142b having substantially the positive operating potential +V portion 170 thereafter, until falling edge 171 occurred, at substantially the same point, before the end of bit time interval T', as trailing edge 167 occurred in its own bit time interval T. Both clock pulses 166 and 170 would, in the ideal case, be centered substantially about the middle (time $t_2$ or time $t_2'$) of the associated bit time interval. In the non-ideal case, the logic zero clock pulse rising edge 169' would occur somewhat later than the rising edge 169 in the ideal case, while the actual falling edge 171' would occur somewhat earlier than the ideal falling edge 171, for the illustrated case with positive-polarity noise pulses. It will be seen that the full-wave rectifier and subsequent threshold detector allow the bit timing information to be easily provided, even in the presence of noise or power line frequency harmonic pulses. If desired, data comparator 122 may be followed by a sample and hold means 175, having the sampling input 175a thereof connected to the threshold detector output 142b, whereby the data pulses at comparator output 122b are provided to input 175b, are sampled and held to provide a synchronized sample-and-hold output 175c waveform.

The receiver integrator means 101 therefore must act in such manner that the magnitude of the integrated output will make only one excursion from a value lower than the threshold of detector means 142, to a value higher than that threshold, during each bit time interval. Further, the integrator output waveform should return to the lower-than-threshold value by the end of the same bit time interval, to insure that only one timing pulse is generated per each received data bit. The setting of potentiometer 160 is established to assure the foregoing criteria. Also, the integrator means output waveform should exhibit a positive value at least once during each logic-one bit time interval, and a negative value at least once during each logic-zero bit time interval. By so establishing the integrator output requirements, receiver 12 will act to minimize the effects of synchronous spikes and result in harmonic noise as follows:

(a) the amplification of amplifier 80, followed by soft limiter means 82, rejects most of the spike energy, whereby the spike magnitude does not substantially exceed the chirp-frequency-modulated carrier signal level;

(b) the bandpass filter 84 substantially rejects out-of-band spike harmonic content;

(c) the phase-locked loop means 86 utilizes a narrow-band low-pass filter and is therefore potentially affected only by those power line harmonics which fall within the relatively narrow passband of the low pass filter (which includes capacitor 92c). Even those power line frequency harmonics falling within the passband of the low-pass filter are to some extent reduced by a "harmonic cancellation" process to be described hereinbelow. It is especially advantagious in that there are no discontinuities in the instantaneous carrier frequency (as shown in FIG. 1a) and the phase-locked loop can therefore utilize a very-narrow-band low-pass filter, thereby reducing the phase-locked loop means susceptibility to both harmonic and white-Gaussian noise;

(d) the chirp-frequency-modulation technique reduces harmonic noise susceptibility due to the afore-mentioned "harmonic cancellation."

Referring now to FIGS. 6a-6d, the harmonic cancellation process may be understood by referring, initially, to the case (FIGS. 6a and 6b) where only one harmonic is present, at a frequency $f_H$ in the transmission frequency bandwidth between the minimum frequency $f_c - \Delta f$ and the maximum frequency $f_c + \Delta f$. While either a logic-one or a logic-zero data bit may be transmitted and the harmonic frequency may be above or below the center frequency, the same results obtain; accordingly, harmonic cancellation will be discussed illustratively with respect to transmission of a logic-one data bit and a harmonic frequency $f_H$ greater than the center frequency $f_c$, but less than the maximum frequency $f_c + \Delta f$. Thus, during bit time interval T the phase-locked loop means output voltage V86b' starts at zero magnitude at time $t_0$ and substantially linearly increases as the instantaneous transmitted frequency also substantially linearly increases from the center frequency $f_c$. When the chirp frequency reaches the harmonic frequency $f_H$ (at time $t_a$), the phase-locked loop means frequency will dwell at the harmonic frequency for some time $\Delta t$, with the PLL means output voltage remaining at $V_H$ until time $t_b$, before resuming carrier tracking at the end of that small time interval. Thus, output voltage V86$b'$ substantially linearly increases from zero magnitude at time $t_0$, to magnitude $V_H$ at time $t_a$, and then remains at voltage $V_H$ for the $\Delta t$ time interval, until time $t_b$. Thereafter the PLL means output voltage resumes its increase until the maximum voltage $V_P$ is reached at time $t_1$, when one-quarter of bit time interval T has elapsed. Thereafter, the output voltage decreases as the chirp frequency substantially linearly decreases, until the harmonic frequency $f_H$ is again reached. At this time $t_c$, the phase-locked loop means again locks to the harmonic frequency for some time interval $\Delta t'$, with the substantially constant voltage $V_H$ being output therefrom. At the end of time interval $\Delta t'$, i.e. at time $t_d$, the loop means resumes carrier tracking and the output voltage decreases to the negative peak voltage $-V_P$, at time $t_3$, before substantially linearly increasing to zero magnitude, at time $t_0,'$, responsive to the now-increasing chirp frequency.

The integrator means output voltage V101$b'$ thus starts at a substantially zero magnitude at time $t_0$ and would normally have the ideal waveshape 180, reaching a peak at time $t_2$ (at the middle of bit time interval T) and returning to zero amplitude at time $t_0$; at the end of bit time interval T. However, at time $t_a$, the integrator input voltage remains constant, instead of continuing to substantially linearly increase, whereby the actual output voltage tends to increase somewhat more slowly, than in the ideal case, as shown by portion 181. At time $t_b$, the increase of the integrator input voltage re-commences and a more rapid increase in the integrator output voltage (portion 182) occurs. At time $t_c$ the actual input voltage does not substantially linearly decrease, but remains constant for the time interval $\Delta t'$, whereby the actual output voltage continues to increase (portion 183) until time $t_d$, at a rate more rapid than the rate of change if the substantially linearly decreasing input voltage were present. If the dwell times $\Delta t$ and $\Delta t'$ are identical, the integrator output waveform will be essentially identical, after time $t_d$, in either the ideal, non-harmonic case or in the actual, harmonic-present case. Even if the dwell times are slightly different, the remainder of waveform 180 will be substantially identical after time $t_d$, in both cases. Thus, it will be seen that the effects of the power line frequency harmonic is essentially negated, although the integrator output waveform symmetry is destroyed.

Figure 6A:
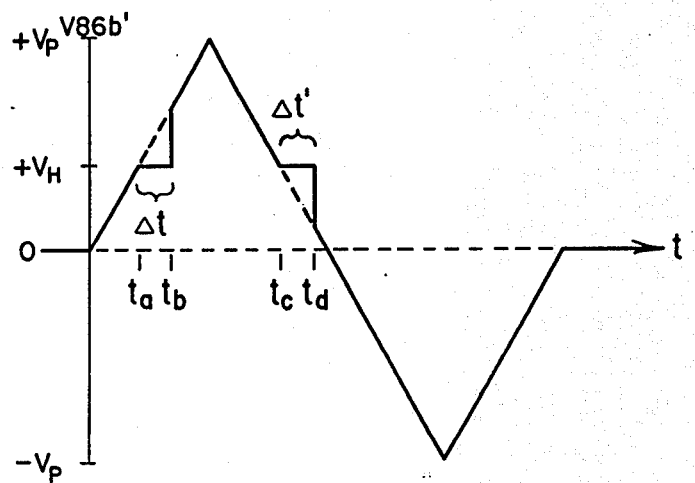
FIGS. 6a-6b and 6c-6d are sets of coordinated waveforms illustrating the rejection of power line frequency harmonics in a power line communication system utilizing the methods and apparatus of the present invention.
Figure 6B:
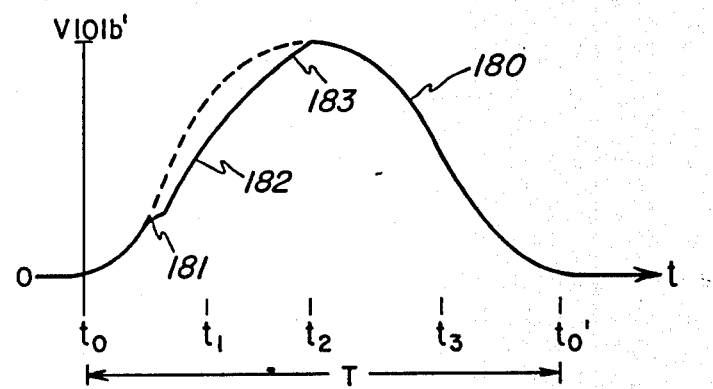
Figure 6C:
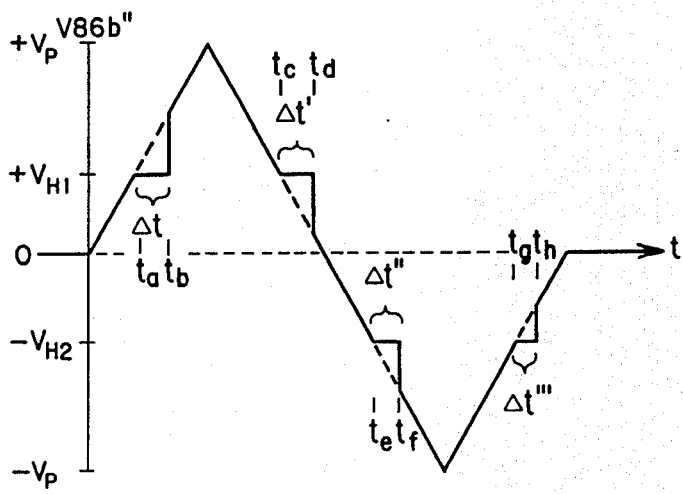
Figure 6D:
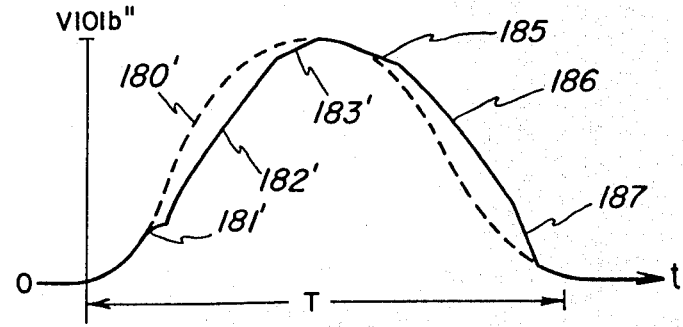

Referring now to FIGS. 6c and 6d, a plurality of harmonics, e.g. two, are present, with a first harmonic being present at a frequency $f_{H1}$ above the center frequency $f_c$ and another harmonic being present at a frequency $f_{H2}$ below the center frequency. Again, while either a logic-one or a logic-zero data bit may be transmitted, the same results obtain, and harmonic cancellation will be discussed illustratively with transmission of a logic-one data bit.

During bit time interval T the phase-locked loop means output voltage V86$b''$ starts at zero magnitude at time $t_0$ and substantially linearly increases as the instantaneous transmitted frequency also substantially linearly increases from the center frequency $f_c$. The chirp frequency reaches upper harmonic frequency $f_{H1}$ at time $t_a$ and the phase-locked loop means frequency then dwells at this harmonic frequency for the small time interval $\Delta t$, until time $t_b$. The phase-locked loop means output voltage therefore remains at voltage $+V_{H1}$ from time $t_a$ to time $t_b$ and then resumes carrier tracking, with a substantially linear increase to the positive peak voltage $+V_P$, at time $t_1$, when one-quarter of bit time interval T has elapsed. Thereafter, the output voltage decreases as the chirp frequency substantially linearly decreases, until the harmonic frequency $f_{H1}$ is again reached. At this time $t_c$, the phase-locked loop means again locks to this harmonic frequency for some time interval $\Delta t'$, with the substantially constant loop means output voltage $+V_{H1}$ being output therefrom. At the end of time interval $\Delta t'$, i.e. at time $t_b$, the loop means resumes carrier tracking and the output voltage therefrom substantially linearly decreases until the loop locks to the lower harmonic frequency $f_{H2}$ at time $t_e$. The loop remains locked to the lower harmonic frequency for some time interval $\Delta t''$ and the substantially constant voltage $-V_{H2}$ is output from the PLL means. At time $t_f$, the loop means resumes carrier tracking and the output decreases to the negative peak value $-V_P$, at time $t_3$. Thereafter, the loop means output voltage substantially linearly increases until the loop again locks to the lower harmonic frequency $f_{H2}$, at time $t_g$, for another time interval $\Delta t'''$. The loop output voltage remains substantially constant at $-V_{H2}$, until time $t_h$ when the loop resumes tracking and the output voltage increases to attain a zero magnitude at time $t_0'$, at the end of the bit time interval.

The integrator means output voltage V101$b''$ therefore starts at substantially zero magnitude at time $t_0$ and would normally have the ideal waveshape 180, reaching a peak at time $t_2$ at the middle of bit time interval T and returning thereafter to zero magnitude at time $t_0'$, at the end of bit time interval T. As in the single harmonic case, at time $t_a$ the integrator input voltage remains constant, instead of continuing to substantially linearly increase, with the actual output voltage increasing somewhat more slowly, in portion 181', than the ideal case. At time $t_b$, the integrator input voltage again starts to increase and a more rapid increase in the integrator output voltage, at portion 182', occurs. At time $t_c$, the actual input voltage does not substantially linearly decrease, but remains constant for the time interval $\Delta t'$, with the actual output voltage continuing to increase, in portion 183', until time $t_d$, and at a rate more rapid than the rate of change of the substantially linearly decreasing input voltage were present. Thereafter, the integrator output voltage decreases until time $t_e$, when the integrator input voltage remains constant, at magnitude $-V_{H2}$, instead of continuing to substantially linearly decrease. The actual output voltage therefore tends to decrease somewhat more slowly, in portion 185, than in the ideal case. At time $t_f$, the decrease of the integrator input voltage resumes and a more rapid decrease in integrator output voltage, at portion 186, occurs. The integrator output increasing voltage continues until time $t_g$, when the actual point voltage ceases to decrease and remains constant for time interval $\Delta t'''$, with the integrator output decreasing (portion 187) at a rate more rapid than the rate of change if the substantially linearly increasing voltage were present at the input. It will be seen that if the dwell times $\Delta t$ and $\Delta t'$ are identical, and if the dwell times $\Delta t''$ and $\Delta t'''$ are identical, complete power line frequency harmonic cancellation will occur. Even if the dwell times are slightly different, due to hysteresis effects in the phase-locked loop means or the integrator means, a relatively high degree of power line frequency harmonic rejection will occur.

While the present invention has been described with respect to one presently preferred apparatus embodiment, many variations and modifications of both the apparatus and the chirp frequency-modulation waveform will now become apparent to those skilled in the art. Accordingly, the foregoing description is by way of explanation and not limitation, as my invention is to be limited only by the scope of the appending claims.

What is claimed is:

1. A method for transmitting binary data, comprising the steps of:
    (a) providing a variable-frequency transmitter having a predetermined center frequency;
    (b) selecting a bit time interval in which a bit of said binary data is to be transmitted;
    (c) causing the transmitter instantaneous frequency to be at the center frequency at the beginning and end of each bit time interval;
    (d) continuously varying without discontinuity the instantaneous transmitting frequency at least once during a bit time interval to a maximum frequency greater than the center frequency and then to a minimum frequency less than the center frequency, with the maximum frequency and the minimum frequency respectively occurring at one-quarter and three-quarters of the bit time interval, to transmit a first binary condition; and
    (e) continuously varying without discontinuity the instantaneous transmitter frequency at least once during a bit time interval to a minimum frequency less than the center frequency and then to a maximum frequency greater than the center frequency, with the minimum frequency and maximum frequency respectively occurring at one-quarter and three-quarters of the bit time interval, to transmit a second binary condition.

2. The method of claim 1, wherein the change in instantaneous frequency in each quarter of the bit time interval is substantially linear.

3. The method of claim 1, wherein the instantaneous frequency is substantially equal to the center frequency at the middle of each bit time interval.

4. The methods of claim 3, wherein the change in instantaneous frequency in each quarter of a bit time interval is substantially linear.

5. A method for communicating binary data over a communications medium, comprising the steps of:
    (I) transmitting binary data by:
        (a) defining a bit time interval during which a single bit of data is to be communicated;
        (b) converting each data bit to a first signal waveform having a first binary condition in the first and fourth quarters of the bit time interval and having the remaining binary condition in the second and third quarters of the bit time interval;
        (c) integrating the first signal waveform to obtain a triple-ramp waveform;
        (d) providing a transmitter having an output waveform of variable instantaneous frequency controlled by the instantaneous magnitude of an input waveform at a transmitter control input;
        (e) setting the transmitter to have a predetermined center frequency with a predetermined input waveform magnitude at the control input; and
        (f) applying the triple-ramp waveform as the input waveform to the transmitter control input to vary the instantaneous frequency of the transmitter output to have the center frequency at the beginning, midpoint and end of each bit time interval and to have a maximum frequency, greater than the center frequency, and then a minimum frequency, less than the center frequency, to transmit a data bit having a first binary data value and to have the minimum frequency and then the maximum frequency to transmit a data bit having a second binary data value;
    (II) conveying the transmitter output waveform over the medium to at least one receiver; and
    (III) recovering the binary data contained in the transmitter output waveform received signal at each of the at least one receiver by:
        (a) frequency-demodulating the frequency variations of the received signal;
        (b) integrating the frequency-demodulated signal; and
        (c) comparing the integrated and frequency-demodulated signal with a reference level to obtain the binary value of each data bit sent by the transmitter.

6. The method of claim 5, wherein step (III) further comprises the step (d) of recovering a data clock waveform from the integrated and frequency-demodulated signal.

7. The method of claim 6, wherein the data clock waveform of step (IIId) is a pulse occurring in the bit time interval of each bit of received binary data recovered.

8. The method of claim 7, wherein step (IIId) includes the steps of: full-wave rectifying the integrated and frequency-demodulated signal; and threshold-detecting the rectified signal to recover a clock waveform having a single pulse during each bit time interval.

9. The method of claim 6, wherein the transmitter frequency change is substantially linear.

10. The method of claim 5, wherein step (III) further includes the step of amplifying the received signal prior to frequency-demodulating step (IIIa).

11. The method of claim 10, wherein the amplifying step includes the step of automatically controlling the amount of amplification in accordance with the magnitude of the received signal.

12. The method of claim 10, further comprising the step of band-pass filtering the amplified received signal prior to frequency-demodulating step (IIIa).

13. The method of claim 10, further comprising the step of soft-limiting the amplitude of the amplified received signal prior to frequency-demodulating step (IIIa).

14. The method of claim 13, further comprising the step of bandpass filtering the amplified and soft-limited received signal prior to frequency-demodulating step (IIIa).

15. The method of claim 5, further comprising the step of bandpass filtering the received signal prior to frequency-demodulating step (IIIa).

16. The method of claim 5, further comprising the step of soft-limiting the amplitude of the received signal prior to frequency-demodulating step (IIIa).

17. The method of claim 16, further comprising the step of bandpass filtering the soft-limited received signal prior to frequency demodulating step (IIIa).

18. The method of claim 5, wherein converting step (Ib) comprises the steps of: providing each of a plurality of binary data bits in each successive one of a plurality of bit time intervals; providing a clock signal having four substantially equally spaced pulses in each bit time interval; providing a four-stage shift register; loading the binary value of each successive data bit into the second and third stages of the shift register responsive to a first one of the four clock pulses in the of bit time interval associated with the data bit being sent; loading the inverse of that binary value into the first and fourth stages of the shift register reponsive to the same first clock pulse of that bit time interval; and serially shifting the contents of all four shift register stages from the shift register, with each of the four required shifts being responsive to one of the four clock pulses of the associated bit time interval.

19. Apparatus for transmitting a chirp frequency-modulated carrier responsive to the binary value of a data bit occurring in a bit time interval, comprising:
    means receiving each binary data bit for providing a triple-ramp waveform having a predetermined value at at least the beginning and end of each bit time interval and having a maximum value, greater than the predetermined value, preceding a minimum value, less than the predetermined value, if a first binary condition is to be transmitted and having the minimum value preceeding the maximum value if a second binary condition is to be transmitted; and
    means having a control input receiving the triple-ramp waveform for providing a carrier waveform at a predetermined center frequency responsive to receipt of said predetermined value at the control input and having an instantaneous frequency differing from said center frequency responsive to the instantaneous value of the triple-ramp waveform.

20. The apparatus of claim 19, wherein the carrier providing means is a voltage-controlled oscillator having said control input and an output at which is provided a waveform having an instantaneous frequency controlled by the instantaneous value of the waveform at said control input.

21. The apparatus of claim 20, wherein the oscillator center frequency is on the order of 150KHz.

22. The apparatus of claim 17, wherein said apparatus also receives four data clock pulses within each bit time interval, and said triple-ramp waveform providing means includes: a four-stage shift register with each stage having an input, and having a register output, said shift register having a first control input for loading into each stage the binary value contained at the input thereof, and having a second control input for serially-shifting the contents of the four register stages from said register output;
    first input means for receiving the binary data bit in each bit time interval; said first input means being connected to the second and third shift register stage inputs;
    means for inverting the value of a binary data bit presently presented at the data input means for presentation to the first and fourth shift register stage input;
    second input means for receiving the data clock pulses; said second input means being connected to the second shift register control input;
    means for applying the first data clock pulse received at said second input means, in each bit time interval, to said shift register first control input; and
    means for integrating the output of the shift register to obtain the triple-ramp waveform.

23. The apparatus of claim 22, wherein said first clock pulse applying means is a divide-by-four counter.

24. The apparatus of claim 22, further comprising means coupled between the shift register output and the integrating means input for shifting the level of the shift register waveform.

25. The apparatus of claim 22, further comprising means coupled between said integrating means and the carrier providing means for varying the amplitude of the triple-ramp waveform applied to the carrier providing means.

26. The apparatus of claim 25, further comprising means coupled between the amplitude varying means and carrier providing means for shifting the level of the triple-ramp waveform applied to the carrier providing means control input.

27. The apparatus of claim 22, further comprising means coupled between the integrating and carrier providing means for shifting the level of the triple-ramp waveform applied to the carrier providing means control input.

28. Apparatus for recovering the binary value during a bit time interval of a data bit transmitted as a chirp-frequency-modulated carrier signal, comprising:
    input means for receiving the chirp-frequency-modulated signal;
    means for frequency demodulating the chirp-frequency-modulated signal at said input means to provide an output signal having a magnitude responsive to the instantaneous frequency of the received chirp-frequency-modulated signal;
    means for integrating, with respect to time, the output signal of the frequency demodulating means; and
    means for comparing the integrating means output with a reference level to obtain the binary value of the data bit encoded on the chirp-frequency-modulated carrier signal received at said input means during each bit time interval.

29. The apparatus of claim 28, further comprising means for recovering a data clock waveform from the integrating means output.

30. Apparatus for recovering the binary value during a bit time interval of a data bit transmitted as a chirp-frequency-modulated carrier signal, comprising:
    input means for receiving the chirp-frequency-modulated signal;
    means for frequency demodulating the signal at said input means and providing an output signal having a magnitude responsive to the instantaneous frequency of the received signal;
    means for integrating, with respect to time, the output signal of the demodulating means;
    means for comparing the integrating means output with a reference level to obtain the binary value of the data bit encoded on the chirp-frequency-modulated carrier signal received at said input means during each bit time interval; and
    means for recovering a data clock waveform from the integrating means output and including: means for full-wave rectifying the integrating means output; means for providing a threshold level; and means for comparing the rectifying means output with the threshold level to recover a clock waveform having a single pulse during each bit time interval.

31. The apparatus of claim 28, wherein the frequency-demodulating means includes a phase-locked loop.

32. The apparatus of claim 28, further comprising means for amplifying the magnitude of the signal received at said input means, prior to frequency demodulation.

33. The apparatus of claim 32, wherein said amplifying means is adapted for automatic gain control.

34. The apparatus of claim 32, further including means for soft-limiting the amplitude of the amplified signal, prior to frequency demodulation.

35. The apparatus of claim 34, further comprising means for bandpass filtering the soft-limited signal, prior to frequency demodulation.

36. The apparatus of claim 32, further comprising means for bandpass filtering the amplified signal, prior to frequency demodulation.

37. The apparatus for claim 28, further comprising means for soft-limiting the amplitude of the signal received at said input means, prior to frequency demodulation.

38. The apparatus for claim 37, further comprising means for bandpass filtering the soft-limited signal, prior to frequency demodulation.

39. The apparatus of claim 28, further comprising means for bandpass filtering the signal received at said input means, prior to frequency-demodulation.

* * * * *